(12) United States Patent
Bement et al.

(10) Patent No.: US 6,765,765 B2
(45) Date of Patent: Jul. 20, 2004

(54) HEAD GIMBAL ASSEMBLY WITH IN-SITUS ADJUSTABLE PITCH AND ROLL

(75) Inventors: Gary E. Bement, Frederic, CO (US); James M. Murphy, Boulder, CO (US); Michael D. Mundt, Longmont, CO (US); Brian D. Denker, Rogers, MN (US); Mark A. Chapin, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 284 days.

(21) Appl. No.: 09/970,363

(22) Filed: Oct. 3, 2001

(65) Prior Publication Data

US 2002/0101686 A1 Aug. 1, 2002

Related U.S. Application Data

(60) Provisional application No. 60/237,961, filed on Oct. 4, 2000.

(51) Int. Cl.$^7$ ................................................ G11B 5/56
(52) U.S. Cl. ................................................ 360/294.3
(58) Field of Search ........................... 360/294.3–294.7

(56) References Cited

U.S. PATENT DOCUMENTS

| | | | |
|---|---|---|---|
| 4,605,979 A | 8/1986 | Inoue et al. ............... 360/105 |
| 5,023,737 A | 6/1991 | Yaeger ....................... 360/105 |
| 5,060,099 A | 10/1991 | Yaeger et al. ............... 360/105 |
| 5,062,018 A | 10/1991 | Yaeger ....................... 360/104 |
| 5,303,105 A | 4/1994 | Jorgenson .................. 360/106 |
| 5,463,514 A | 10/1995 | Yaeger ....................... 360/105 |
| 5,657,188 A | 8/1997 | Jurgenson et al. .......... 360/106 |
| 5,745,319 A | 4/1998 | Takekado et al. ........ 360/78.05 |
| 5,808,837 A | 9/1998 | Norton ....................... 360/105 |
| 5,956,212 A | 9/1999 | Zhu ............................ 360/104 |
| 5,991,114 A | 11/1999 | Huang et al. ................. 360/75 |
| 6,473,259 B1 * | 10/2002 | Kuo et al. .................... 360/75 |

OTHER PUBLICATIONS

U.S. patent application Ser. No. 09/204,642, Schar, filed Dec. 2, 1998.
IBM Technical Disclosure Bulletin, vol. 26, No. 2, Jul. 1983, pp. 846–849.
Abstract of Research from Yonsei University in Korea, 1 page, entitled "Non–Contact Start/Stop Suspension Using SMA" by Jong–Sung Park and Soo–Cheol Lim, at least as early as Nov. 15, 2000.

\* cited by examiner

Primary Examiner—A. J. Heinz
(74) Attorney, Agent, or Firm—Westman, Champlin & Kelly, P.A.

(57) ABSTRACT

An in-situs pitch and/or roll attitude adjustment system. The in-situs adjustment system includes a flexure element having an energizable dimension differential. The flexure element is coupled to a suspension assembly and slider and is energizable to supply a flexure force to the slider to adjust pitch or roll attitudes of the slider.

23 Claims, 10 Drawing Sheets

HEAD GIMBAL ASSEMBLY WITH IN-SITUS ADJUSTABLE PITCH AND ROLL

CROSS-REFERENCE TO RELATED APPLICATION

The present invention claims priority to Provisional Application Serial No. 60/237,961 filed Oct. 4, 2000 and entitled "PSA/RSA Adjustment Using SMA".

FIELD OF THE INVENTION

The present invention relates to a head suspension assembly of a disc drive. In particular, the present invention relates to a head suspension assembly with adjustable pitch and roll attitudes.

BACKGROUND OF THE INVENTION

Data storage devices store digital information on a rotating disc. Heads are supported relative to the disc surface to read data from or write data to the disc. The heads include an air bearing slider which includes a leading edge, a trailing edge and opposed sides. The head or slider is flexibly coupled to a suspension assembly which includes a suspension portion which supplies a load force to the slider at a load point. The load point is positioned between opposed sides of the slider and between the leading and trailing edges of the slider. The load point defines a pitch axis between the leading and trailing edges about which the slider pitches and a roll axis between opposed sides of the slider about which the slider rolls.

For operation, rotation of the disc creates an air flow along an air bearing surface of the slider to create a hydrodynamic lifting force. The hydrodynamic lifting force is countered by the load force supplied by the suspension portion which defines in part a fly height of the slider above the disc surface. During operation, the slider pitches and rolls about the pitch axis and roll axis. Typically the slider is supported at a pitch angle relative to the disc surface so that the trailing edge of the slider is closer to the disc surface than the leading edge. Pitch and roll parameters of the slider affect the fly height of the slider which affects read/write resolution and clarity.

Dynamic pitch and roll of the slider relative to the load point is related to the pitch static attitude (PSA) and roll static attitude (RSA) of the slider. PSA and RSA can vary based upon manufacturing processes and manufacturing tolerances, for example variations in flexure or relative stiffness of the suspension components can introduce variations in PSA and/or RSA parameters of the slider. As previously explained, variations in PSA and RSA parameters can affect pitch of the slider relative to the disc surface and fly height parameters for read or write operations of a disc drive. The present invention addresses these and other problems and offers solutions not previously recognized nor appreciated.

SUMMARY OF THE INVENTION

The present invention relates to an in-situs pitch and/or roll attitude adjustment system. The in-situs adjustment system includes a flexure element having an energizable dimension differential. The flexure element is coupled to a suspension assembly and slider and is energizable to supply a flexure force to the slider to adjust pitch or roll attitudes of the slider. These and various other features, as well as advantages which characterize the present invention, will be apparent upon reading the following detailed description and review of the associated drawings.

BRIEF DESCRIPTION OF THE DRAWINGS

FIG. 7–1 schematically illustrates one embodiment for coupling a flexure element to a slider to adjust a pitch attitude of the slider.

FIG. 7–2 schematically illustrates another embodiment for coupling a plurality of flexure elements to a slider to adjust a pitch attitude of the slider.

DETAILED DESCRIPTION OF ILLUSTRATIVE EMBODIMENTS

Figure 1:
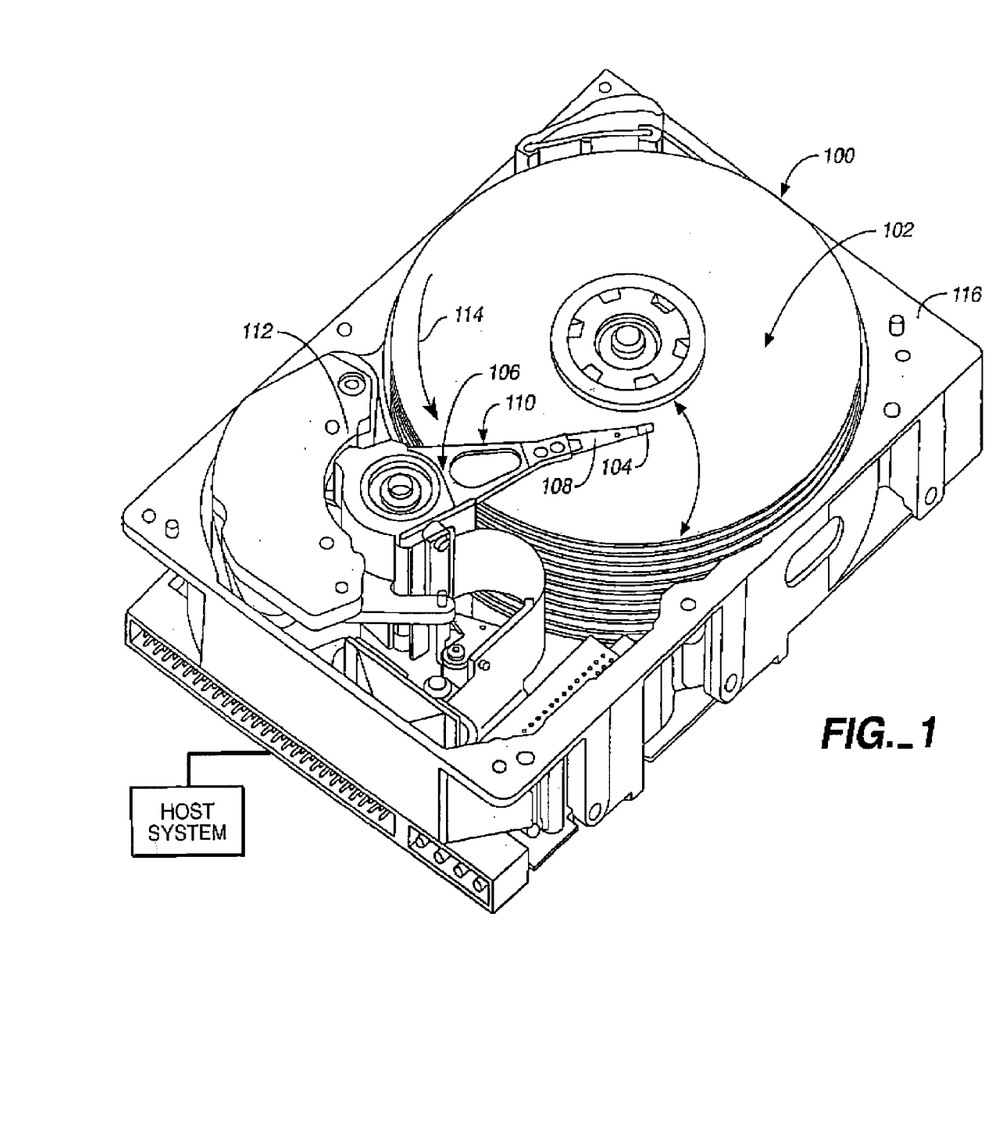
FIG. 1 is a perspective illustration of a disc drive.

FIG. 1 illustrates an embodiment of a disc drive 100 in which digital information is stored on a plurality of discs 102. Heads 104 are positioned relative to the disc surface to read data from or write data to the disc 102. Heads 104 are coupled to an actuator assembly 106 via a suspension assembly 108 which is staked to or secured to actuator arms 110 of the actuator assembly 106. The actuator assembly 106 is powered by a voice coil motor 112 to position heads relative to selected data tracks on the disc surface. As shown, discs 102 are supported on a spindle motor (not shown) which rotates the discs as illustrated by arrow 114 for operation. Rotation of the discs by the spindle motor creates a hydrodynamic lifting force for read/write operations. Components of the disc drive are supported relative to a base chassis 116 of the disc drive. Although a particular disc drive embodiment is shown, application is not limited to the particular embodiment shown.

Figures 2, 3:
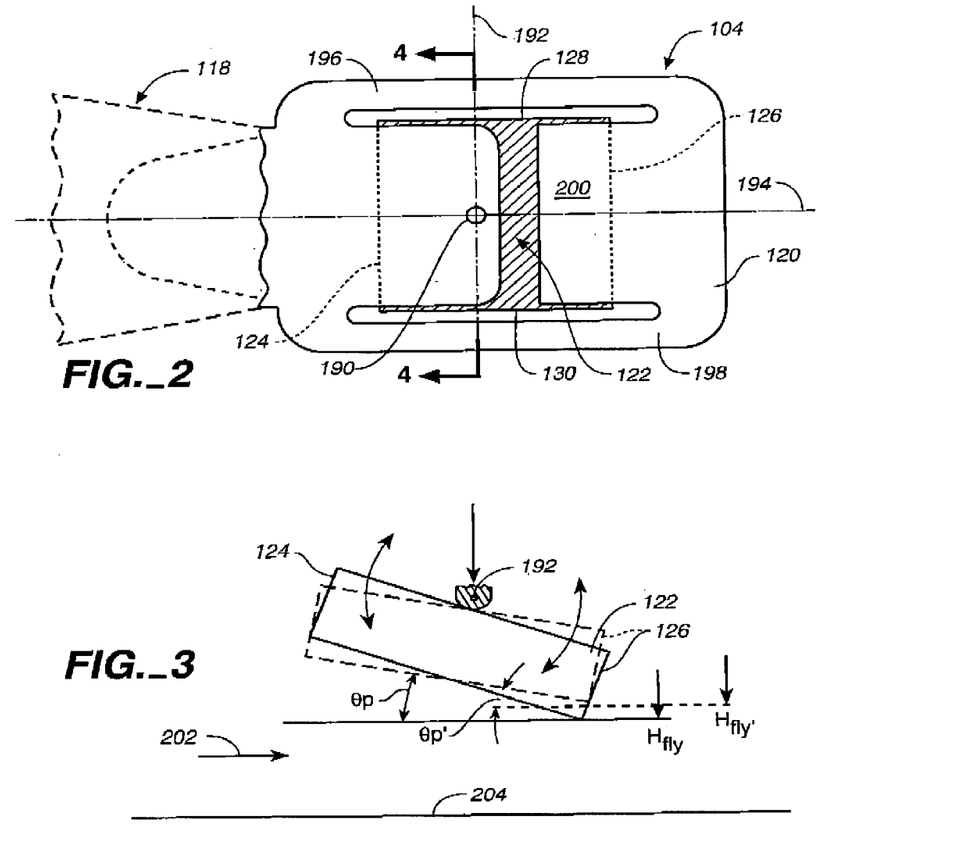
FIG. 2 is a schematic illustration of a suspension assembly having a head coupled thereto.
FIG. 3 schematically illustrates a slider adapted to pitch about a pitch axis so that a trailing edge of the slider flies closer to the disc surface than the leading edge.

FIG. 2 is a detailed illustration of the head 104 coupled to a suspension arm 118 through a gimbal spring 120. Head 104 includes a slider 122 having a leading edge 124, a trailing edge 126 and opposed sides 128, 130. In the illustrated embodiment, the slider 122 includes transducer elements located proximate to the trailing edge 126 of the slider 122. The suspension arm 118 includes a load portion which supplies a pre-load force to the slider at a load point 190. The gimbal spring 120 flexibly supports the slider 122 to pitch about axis 192 defined through load point 190 between the leading and trailing edges 124, 126 of the slider and roll about axis 194 defined through load point 190 between opposed sides of the slider 122 for read/write operations.

In particular, in the embodiment shown, gimbal spring 120 includes opposed spaced gimbal arms 196, 198 which flexibly support the slider 122 relative to load point 190 of suspension arm 118 to pitch and roll relative to axis 192, 194. The slider 122 is secured to or coupled to the gimbal spring 120 via a slider tab 200 coupled to opposed ends of the gimbal arms 196, 198. For operation, as illustrated in FIG. 3, rotation of discs 102 create an air flow as illustrated by arrow 202 along a raised bearing surface of the slider 122 to provide the hydrodynamic lifting force which is countered by the preload force to define in part a fly height $H_{fly}$ of the slider for read/write operations.

As illustrated in FIG. 3, during operation, the slider 122 pitches about axis 192 so that the trailing edge 126 of the slider is positioned closer to the disc surface 204 than the leading edge 124 of the slider. The pitch angle $\Theta_p$ of the slider 122 is related to the pitch static attitude PSA of the slider which is typically optically measured when the slider is lifted against the load force. The PSA can vary depending upon manufacturing process or tolerance variations, such as variations in the flexibility or alignment of the suspension components. Variations in the pitch angle of the slider as comparatively illustrated between $\Theta_p$ and $\Theta_p'$ provides different fly heights parameters $H_{fly}$ and $H_{fly}'$ which affects desired read/write clarity and resolution of the disc drive.

Figure 4:
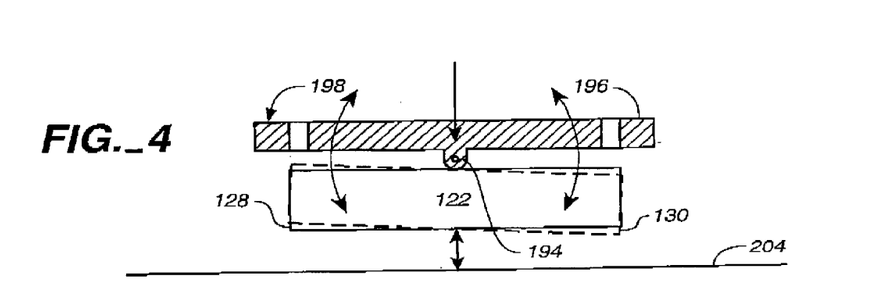
FIG. 4 schematically illustrates a slider adapted to roll relative to a roll axis.

As illustrated in FIG. 4, during operation, the slider 122 rolls about axis 194. Slider roll attitude during operation is related to the roll static attitude RSA of the slider. The RSA of the slider 120 can be optically measured and can also vary depending upon manufacturing process and tolerance variations such as variations in the relative stiffness of opposed sides of the suspension components. Variations in the RSA can also similarly affect fly height and operating parameters of the slider.

Figure 5:
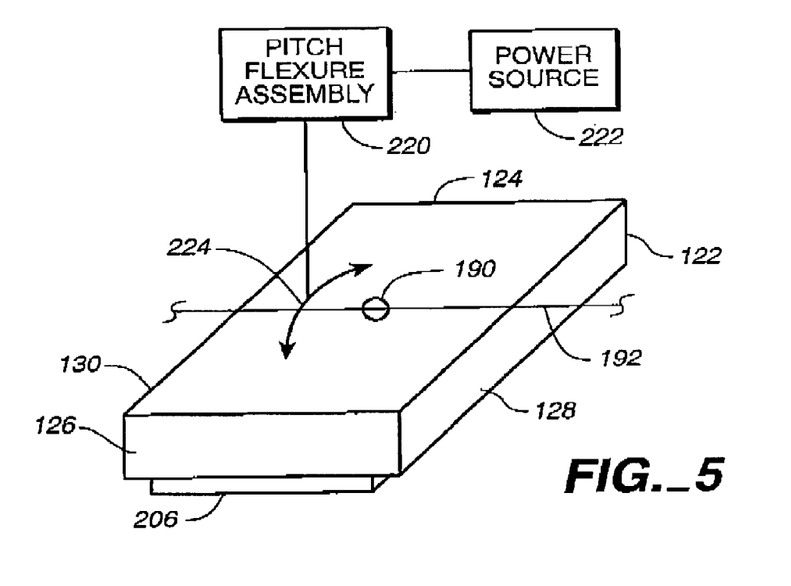
FIG. 5 schematically illustrates a flexure assembly coupled to a slider to adjust a pitch attitude of the slider relative to a pitch axis.
Figure 6:
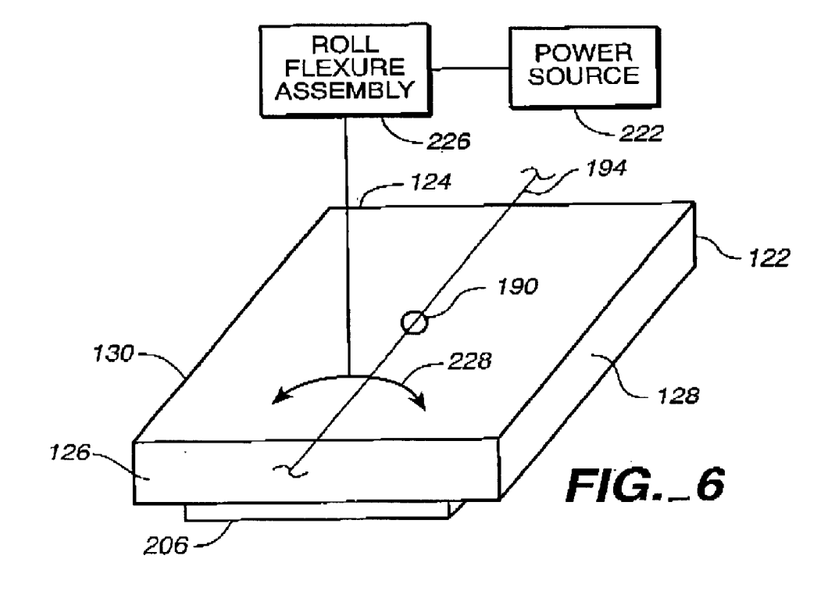
FIG. 6 schematically illustrates a flexure assembly coupled to a slider to adjust a roll attitude of the slider relative to a roll axis.

The present invention relates to an in-situ adjustment system for pitch and roll attitudes of the slider to provide desired read/write control. The in-situ adjustment can be based upon measured deviations of the PSA and RSA from desired or optimum attitudes as will be explained and provides drive level adjustment for deviations in the PSA and RSA. FIG. 5 schematically illustrates in-situ pitch attitude adjustment of the slider 122 including at least one raised air bearing surface illustrated schematically at 206. As shown, the adjustment includes an energizable flexure assembly 220 coupled to the slider 122 which is energizable by power source 222 to pivot slider 122 about axis 192 as illustrated by arrow 224 to adjust the pitch attitude of the slider. FIG. 6 illustrates in-situ roll attitude adjustment which includes a flexure assembly 226 which is energizable by power source 222 to pivot slider 122 about axis 194 as illustrated by arrow 228 to adjust the roll attitude of the slider 122. Although the air bearing surface is illustrated schematically, it should be understood that the in-situ adjustment can be applied to sliders with various air bearing designs including various raised or stepped bearing surfaces.

Figure 71:
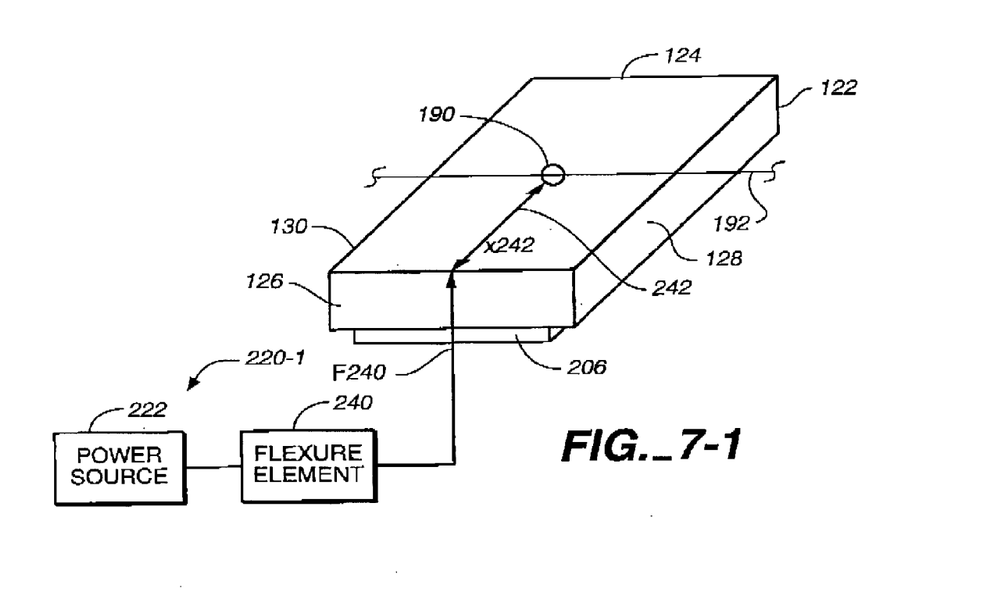

FIG. 7–1 is a schematic illustration of one embodiment of a flexure assembly 220-1 to adjust pitch attitude of the slider. As shown the assembly includes a flexure element 240 coupled to the slider 122 at a distance 242 spaced from the pitch axis 192. The flexure element 240 is energized to supply a flexure force $F_{240}$ to the slider to rotate the slider relative to the pitch axis 192 for in-situ pitch attitude adjustment based upon:

$$T = F_{240} * x_{242} \qquad \text{Equation 1.}$$

where:

T is the torque applied to the slider by the energized flexure element 240;

$F_{240}$ is the flexure force to the slider;

$x_{242}$ is the distance of the force $F_{240}$ from the pitch axis 192; and $$P_A = T/K_P \qquad \text{Equation 2.}$$

where $P_A$ is the pitch attitude adjustment; and $K_P$ is a stiffness constant for pitch stiffness of the suspension.

In the particular embodiment shown, application of $F_{240}$ in the direction shown decreases the pitch attitude for in-situ control. Although in the illustrated embodiment, the flexure force is illustrated at the trailing edge of the slider, the flexure force can be supplied at any distance from the pitch axis 192 and application is not limited to the specific embodiments shown.

Figure 72:
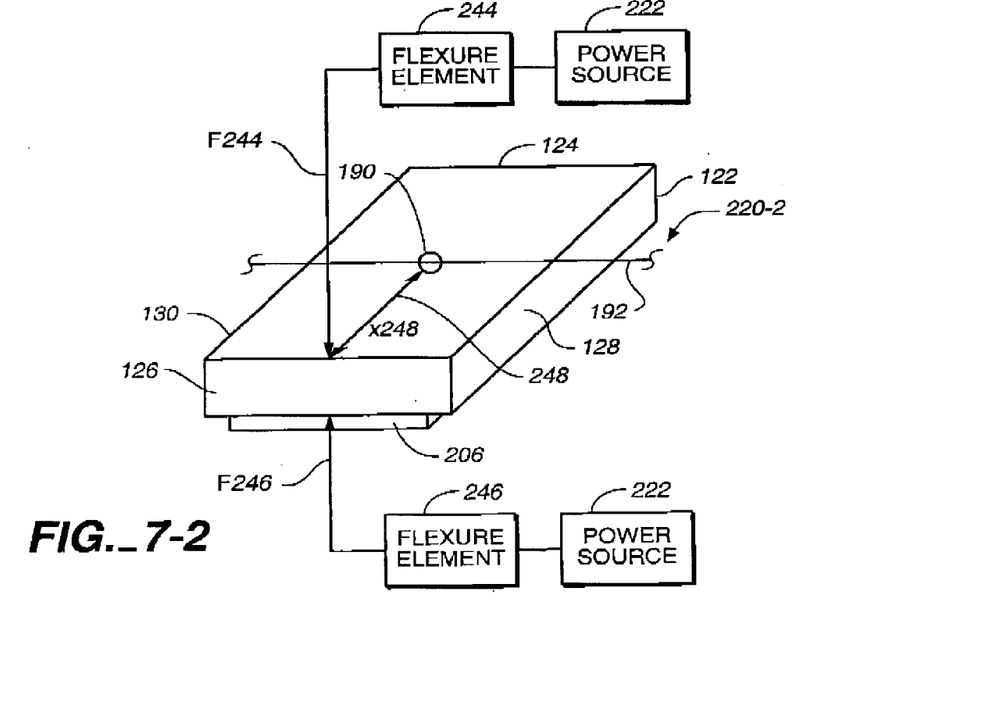

FIG. 7–2 illustrates another embodiment of a flexure assembly 220-2 for in-situ pitch attitude control. As shown, the illustrated embodiment includes opposed flexure elements 244, 246 coupled to the slider at a distance 248 spaced from the pitch axis 192. As shown, the first flexure element 244 is coupled to the slider to supply a first flexure force $F_{244}$ in a first direction and the second flexure element 246 is coupled to the slider to supply a second flexure force $F_{246}$ in a second direction opposed to the first direction to selectively increase or decrease the pitch attitude of the slider based upon:

$$P_A = F_{244} * x_{248} - F_{246} * x_{248}/K_P \qquad \text{Equation 3.}$$

where $P_A$ is the pitch attitude adjustment, $F_{244}$, $F_{246}$ are the flexure forces supplied by flexure elements 244, 246, $x_{248}$ is the distance of $F_{244}$, $F_{246}$ from the pitch axis 192 and $K_P$ is the stiffness constant for pitch stiffness of the suspension. Although FIG. 7–2 illustrates an embodiment of a flexure assembly for selectively increasing or decreasing the pitch attitude of the slider, application is not limited to the particular embodiment or arrangement shown and other arrangements can be used to rotate the slider 122 in opposed directions to increase or decrease the pitch attitude of the slider.

Figure 8:
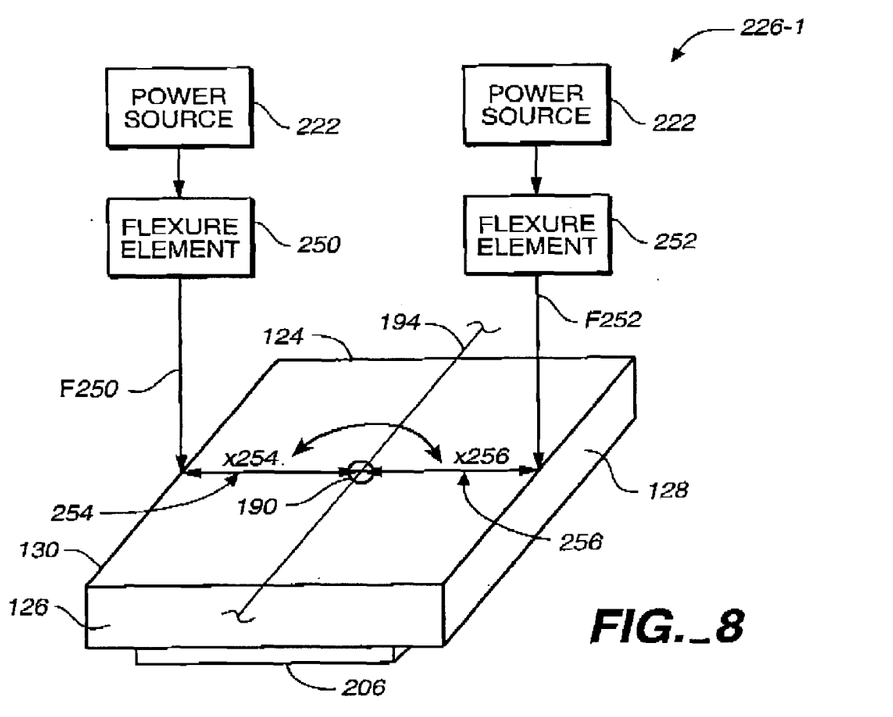
FIG. 8 schematically illustrates one embodiment for coupling flexure elements to a slider to adjust a roll attitude of the slider.

FIG. 8 schematically illustrates one embodiment of a flexure assembly 226-1 for in-situ adjustment of the roll attitude of the slider 122. As shown, the flexure assembly 226-1 embodiment includes flexure elements 250, 252 coupled to the slider 122 on opposed sides of the roll axis 194. As shown flexure element 250 is spaced a distance 254 in a first direction from the roll axis 194 and flexure element 252 is spaced a distance 256 in a second direction from the roll axis 194. The flexure elements 250, 252 are selectively energized via power source 222 coupled to the flexure elements 250, 252 to supply forces $F_{250}$ or $F_{252}$ to adjust the roll attitude of the slider 122 based upon:

$$R_A = F_{250} * x_{254} + F_{252} * x_{256}/K_R \qquad \text{Equation 4.}$$

where:

$R_A$ is the roll attitude adjustment based upon application of forces $F_{250}$ and $F_{252}$ on opposed sides of the roll axis 194 spaced distances $x_{254}$, $x_{256}$ from the roll axis 194, respectively and roll stiffness $K_R$ of the suspension.

Figure 9:
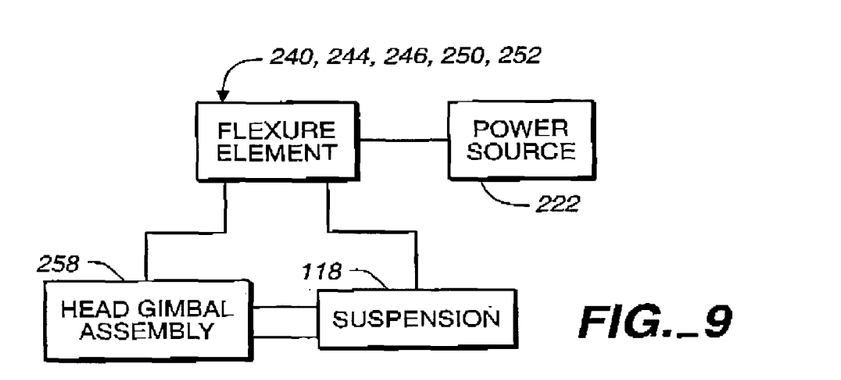
FIG. 9 schematically illustrates an embodiment for coupling a flexure element to a slider and suspension assembly to adjust pitch or roll attitudes of the slider.

As shown in FIG. 9, flexure elements 240, 244, 246, 250, 252 are coupled between the slider (or gimbal spring) as illustrated by block 258 and the suspension 118 and include an energizable length or dimension differential. The energized length or dimension differential supplies a flexure force to the slider to bend or flex the slider relative to the suspension as previously described for in-situ pitch or roll attitude adjustment. The magnitude of the flexure force is dependent upon the energized length or dimension differential.

Figure 10:
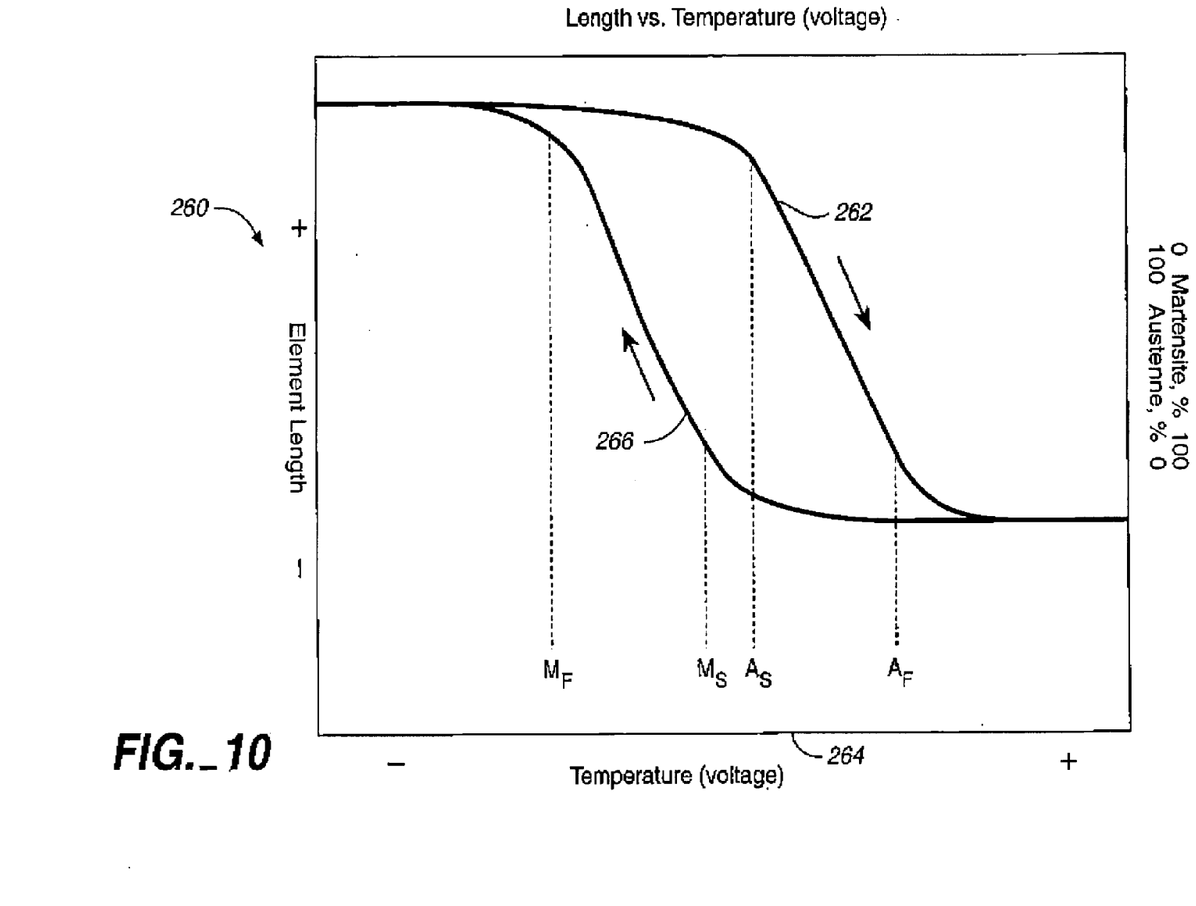
FIG. 10 graphically illustrates an energizable dimension differential as a function of temperature for a shape memory alloy.

FIG. 10 graphically illustrates an energizable length differential as illustrated by axis 260 for a shape memory alloy, such as Nitinol (a nickel titanium alloy). As shown, a length dimension of the shape memory alloy undergoes a length dimension change as illustrated by line 262 when heated or energized as illustrated by temperature axis 264. As shown by line 262, the length dimension constricts as the material structure changes from a martensite to austenite. After heat or the power source is removed, the shape memory alloy or material recovers its original length dimension as illustrated by line 266 to provide shape memory. Thus, the flexure element or shape memory alloy or material is energized by supplying a voltage potential across a length dimension of the flexure element or shape memory alloy to induce a dimensional change to supply a flexure force as described for in-situ pitch and roll attitude adjustment.

Figure 11:
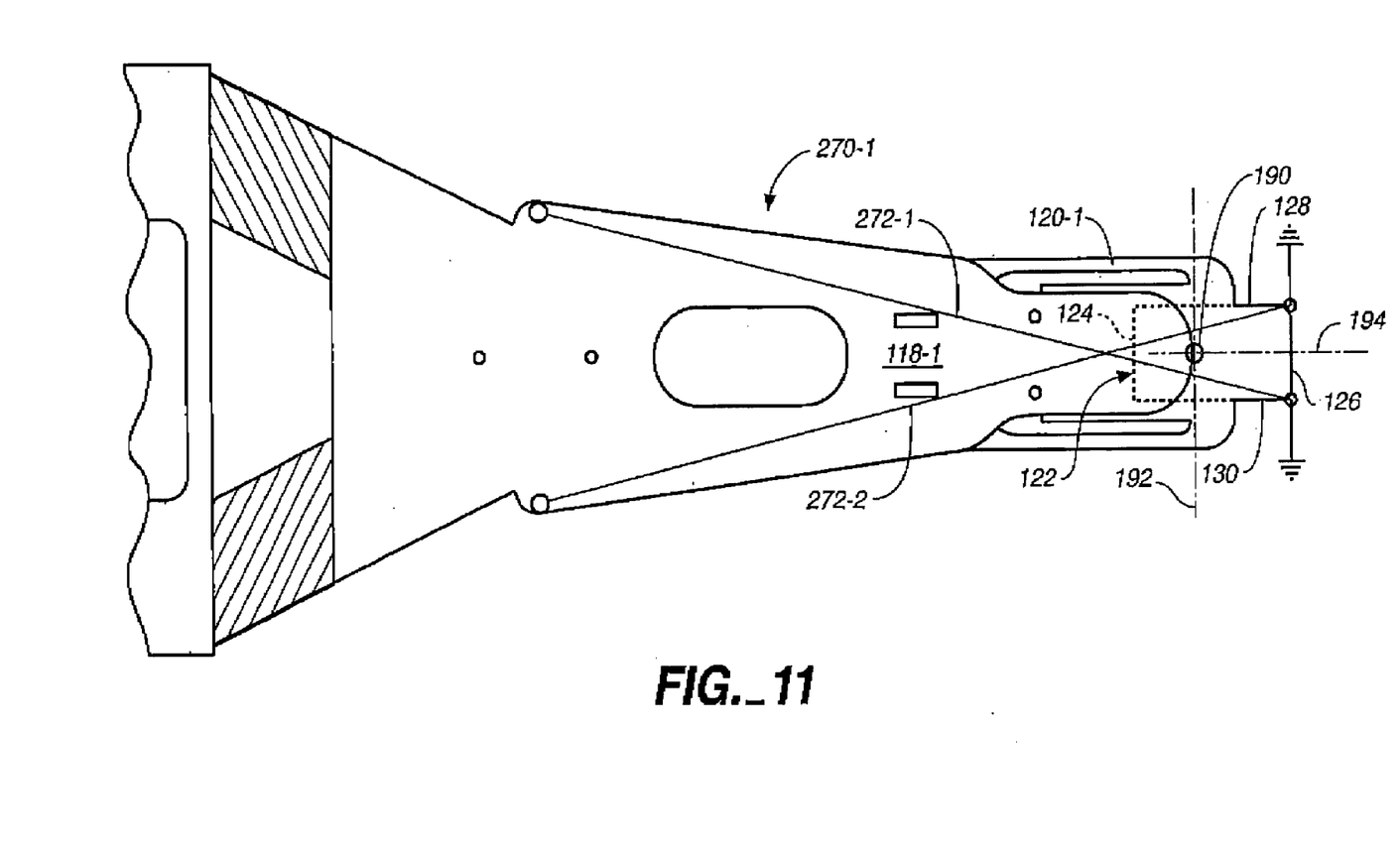
FIG. 11 illustrates one embodiment of a head suspension assembly including flexure elements to adjust pitch or roll attitudes of the slider.

FIG. 11 is a plan view of one embodiment of a head suspension assembly 270-1 with in-situ pitch and roll attitude adjustment where like numbers are used to like parts in the previous FIGS. In the illustrated embodiment shown, the head suspension assembly 270-1 includes two shape memory alloy wires 272-1, 272-2 having an energizable length differential. The shape memory alloy wires 272-1, 272-2 include a first end coupled to the suspension 118-1 and a second end coupled to the slider 122 or gimbal spring 120-1 at a distance spaced from the pitch axis 192 of the slider (in the particular embodiment the second end of the wires 272-1, 272-1 are coupled proximate to a trailing edge 126 of the slider). Wires 272-1, 272-1 are collectively energized to supply a flexure force to adjust the pitch attitude of the slider. Wires 272-1, 272-2 are collectively energized by supplying a voltage potential to terminals at opposed first and second ends of the wires. In the particular embodiment shown, the second ends of the wires 272-1, 272-1 are grounded although application is not limited to grounding any particular end.

In the illustrated embodiment, the second ends of wires 272-1, 272-2 are coupled to opposed sides of the roll axis 194. Wires 272-1, 272-2 are selectively energized to adjust the roll attitude of the slider. Thus, to adjust roll attitude in a first direction, a voltage potential is supplied to wire 272-1 and to adjust roll attitude in a second direction, a voltage potential is supplied to wire 272-2 which selectively causes a length of the wires to constrict for in-situ roll attitude adjustment. As shown, wires 272-1, 272-2 cross and connect to opposed sides of the suspension and slider for desired stability.

Figure 12:
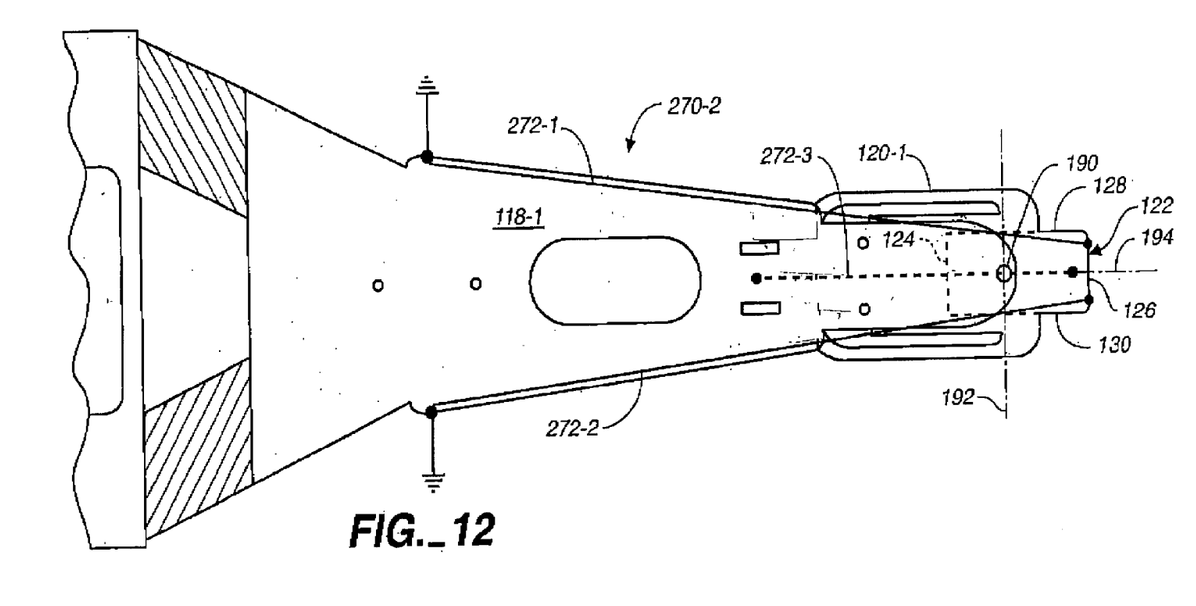
FIG. 12 is a plan view of another embodiment of a head suspension assembly including flexure elements to adjust pitch or roll attitudes of the slider.
Figure 13:
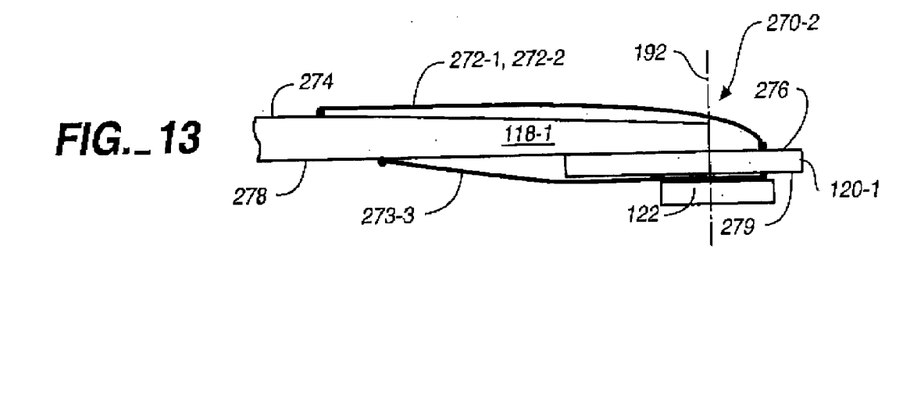
FIG. 13 is a side elevational view illustrating opposed flexure elements for selectively increasing or decreasing pitch attitude of the slider.

FIGS. 12–13 illustrate another embodiment of a head suspension assembly 270-2 with in-situ pitch and roll attitude adjustment. As shown, the suspension assembly 270-2 includes shape memory alloy wires 272-1, 272-2, 272-3 having an energizable length differential. Wires 272-1, 272-2 have a first end coupled to first surface 274 of the suspension 118-1 and a second end coupled to the slider (or first surface 276 of a gimbal spring) at a distance spaced from the pitch axis 192. Wires 272-1, 272-2 are energizable to supply a flexure force in a first direction to adjust pitch attitude of the slider in a first direction.

Wire 272-3, as illustrated by dotted line in FIG. 12, has a first end coupled to an opposed second suspension surface 278 and a second end coupled a second surface 279 of the gimbal spring 120-1 and is energizable to supply a flexure force in a second direction to adjust the pitch attitude of the slider in a second opposed direction to provide dual direction in-situ pitch attitude adjustment. As shown, wire 272-3 or flexure element extends between gimbal spring 120-1 and slider 122 to couple to the slider forward of the pitch axis 192. In one example, wire 273-3 or flexure element extends through an elongated slot formed in the gimbal spring or slider so that the slider and gimbal spring are in abutting relation with the flexure element or wire 272-3 extending therebetween.

For roll attitude adjustment, the second ends of wires 272-1, 272-2 are coupled to opposed sides of the slider 122 spaced in opposed directions from the roll axis 194 as shown in FIG. 12. Wires 272-1, 272-2 are selectively energized to adjust the roll attitude of the slider. Although a particular number of wires is shown in the illustrated embodiments, application is not limited to the particular number of wires shown and alternate designs can be used which supply a flexure force spaced from the pitch axis for pitch attitude adjustment and which supply a flexure force spaced from the roll axis for roll attitude adjustment.

Figure 14:
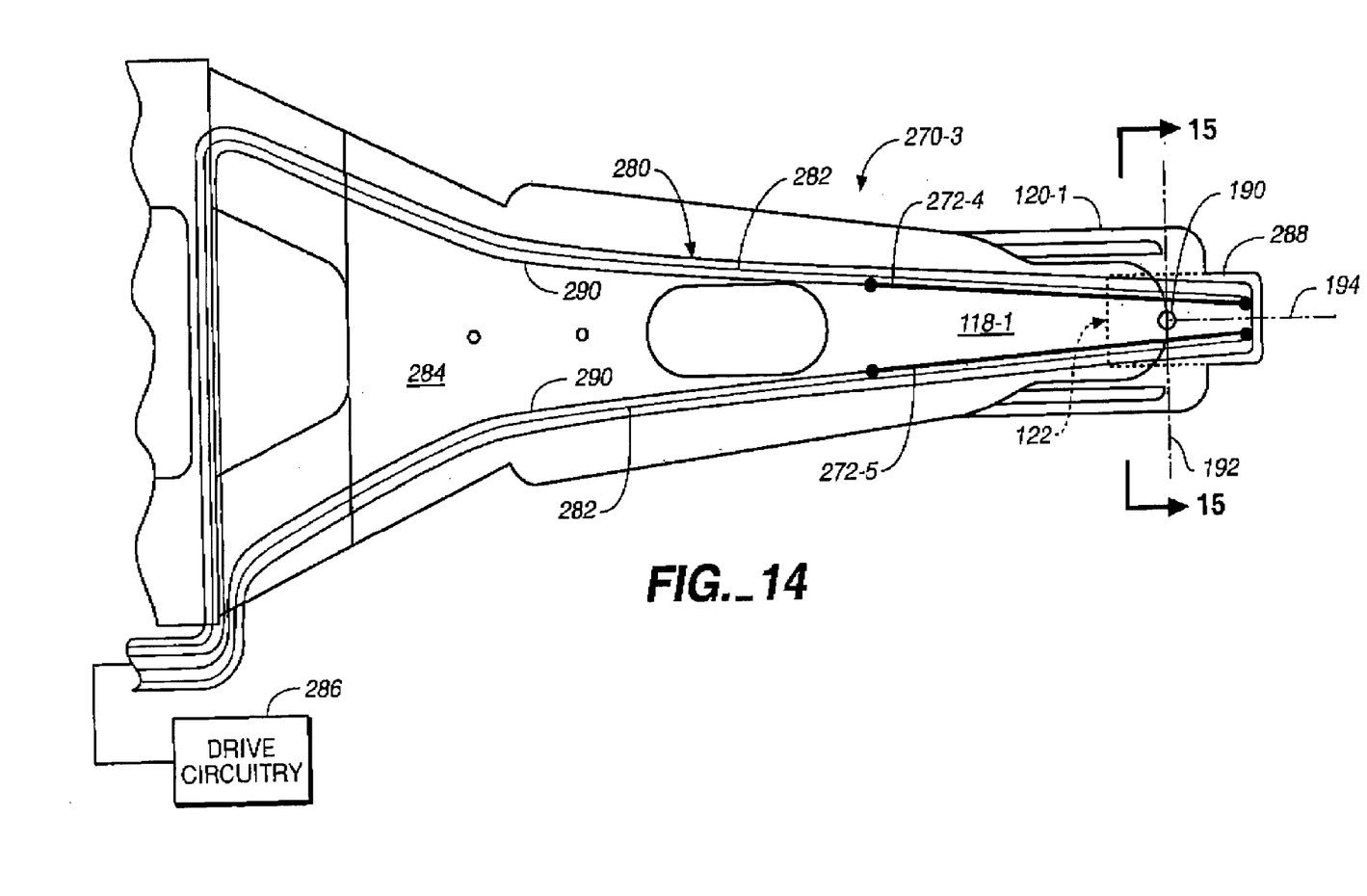
FIG. 14 illustrates another embodiment of a head suspension assembly including flexure elements to adjust pitch or roll attitudes of the slider.
Figure 15:
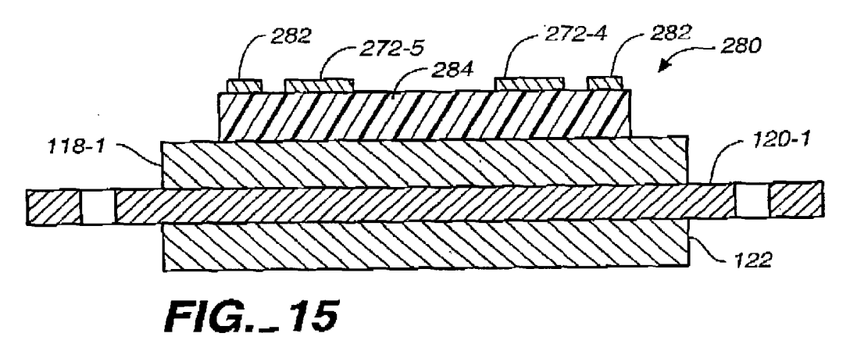
FIG. 15 is a cross-sectional view taken along line 15—15 of FIG. 14.

FIGS. 14-15 illustrate another embodiment of a head suspension assembly 270-3 with in-situ pitch and roll attitude adjustment. As shown, the embodiment includes shape memory flexure elements 272-4, 272-5 formed on a flexible suspension circuit 280 including a plurality of transducer leads 282 fabricated on a flexible base material 284 (such as a polyimide material shown in FIG. 15) to electrically couple transducers on the slider 122 to drive circuitry 286. The shape memory flexure elements 272-4, 272-5 are printed on the flexible base material by known fabrication techniques.

As shown, the flexure elements 272-4, 272-5 are printed on an extended portion of the flexible suspension circuit 280 which extends to and is coupled to an exposed or extended portion 288 of the gimbal spring 120-1 so that flexure elements 272-4, 272-5 extend from the suspension to a distance spaced from the pitch axis 192 of the slider 122 to adjust pitch attitude of the slider 122. Flexure elements 272-4, 272-5 are fabricated on opposed sides of the flexible base material spaced from the roll axis 194 so that the flexure elements 272-4, 272-5 are energizable to adjust roll attitude of the slider. Flexure leads 290 are also printed on the base material 284 to provide a voltage potential across opposed terminals of the flexure elements 272-4, 272-5 as shown in FIG. 14. Although a particular integrated arrangement is shown, other designs can be used and integrated to provide dual direction pitch and roll attitude adjustment.

Figure 16:
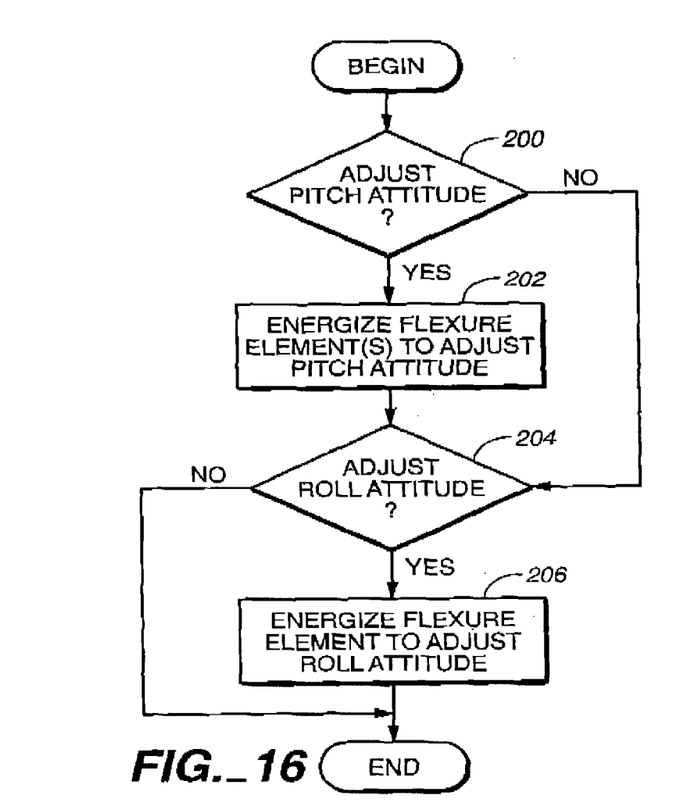
FIG. 16 is a flow chart illustrating steps for adjusting pitch and/or roll attitudes of the slider.

FIG. 16 is a flow chart illustrating steps for in-situs adjustment of pitch or roll attitudes of the slider. As shown by block 200, should pitch attitude need adjusting a flexure element is energized to adjust the pitch attitude of the slider as illustrated by block 202. As shown by block 204, should the roll attitude need to be adjusted, a flexure element is energized to adjust the roll attitude of the slider as illustrated by block 206. Thus, as described pitch and/or roll attitudes can be adjusted based upon measured variances of the PSA or RSA from desired or optimum parameters.

The present invention relates to an in-situs pitch and/or roll attitude adjustment system. The in-situs adjustment system includes at least one flexure element (such as 240, 244, 246, 250, 252, 272) having an energizable dimension differential. The flexure element (such as 240, 244, 246, 250, 252, 272) is coupled to a suspension assembly 118 and slider 122 and is energizable to supply a flexure force to the slider 122 to adjust pitch or roll attitudes of the slider 122. In one embodiment, at least one flexure element is coupled to the slider 122 at a distance spaced from a pitch axis 192 of the slider and is energized to adjust the pitch attitude of the slider. For roll attitude adjustment, flexure elements are coupled to the slider on opposed sides of a roll axis 194 and selectively energized to adjust a roll attitude of the slider.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular disc drive system, it will be appreciated by those skilled in the art that the teachings of the present invention can be applied to other systems, like an optical disc drive system, without departing from the scope and spirit of the present invention.

What is claimed is:

1. A head suspension assembly comprising:
    a suspension portion;
    a head portion coupled to the suspension portion; and
    an energizable flexure element formed of a shape memory alloy coupled to the suspension portion and coupled to the head portion at a distance spaced from a pitch axis of the head portion and energizable to supply a flexure force to adjust a pitch attitude of the head portion.

2. The head suspension assembly of claim 1 including a flexible gimbal spring and the flexure element is connected to the gimbal spring of the head portion to supply the flexure force to the head portion to adjust the pitch attitude of the head portion.

3. The head suspension assembly of claim 1 wherein the flexure element is integrated on a flexible suspension circuit including a plurality of transducer leads printed thereon.

4. The head suspension assembly of claim 1 including a roll axis defined relative to a load point for the head portion and further comprising
    a plurality of energizable flexure elements coupled to the suspension portion and coupled to the head portion on opposed first and second sides of the roll axis of the head portion and the flexure element on the first side of the roll axis being energizable to supply a flexure force to adjust a roll attitude of the head portion in a first direction and the flexure element on the second side of the roll axis being energizable to supply a flexure force to adjust the roll attitude of the head portion in a second opposed direction.

5. The head suspension of claim 4 wherein the plurality of flexure elements includes first and second flexure elements energizable to provide a flexure forces to adjust the pitch attitude of the head portion in a first direction and further comprising a third flexure element coupled to the suspension portion and coupled to the head portion and energizable to provide a flexure force to adjust the pitch attitude of the head portion in a second opposed direction.

6. The head suspension assembly of claim 1 and comprising a plurality of flexure elements formed of the shape memory alloy coupled to the head portion including a first flexure element coupled to the head portion to supply a first flexure force to the head portion to adjust the pitch attitude of the head portion in a first direction and a second flexure element coupled to the head portion to supply a second flexure force to the head portion to adjust the pitch attitude of the slider in a second direction opposed to the first direction to selectively increase or decrease the pitch attitude of the slider.

7. The head suspension assembly of claim 1 including a first flexure element coupled to the head portion to supply a first flexure force orientated in a first direction and a second flexure element coupled to the head portion to supply a second flexure force orientated in a second opposed direction to selectively adjust the pitch attitude of the head portion in the opposed first and second directions.

8. The head suspension assembly of claim 6 wherein the first and second flexure elements are coupled to the head portion proximate to a trailing edge of a slider of the head portion.

9. A head suspension assembly comprising:
    a suspension portion including a suspension arm;
    a head portion coupled to the suspension portion; and
    a plurality of energizable flexure elements coupled to the suspension arm and coupled to the opposed sides of the head portion spaced from a roll axis defined relative to a load point of the suspension portion and one of said flexure elements being energizable to supply a flexure force to adjust a roll attitude of the head portion in a first direction and the other of said flexure elements being energizable to supply a flexure force to adjust the roll attitude of the head portion in a second opposed direction.

10. The head suspension assembly of claim 9 wherein the plurality of flexure elements are formed of a shape memory alloy.

11. The head suspension assembly of claim 9 wherein the plurality of flexure elements are formed of a plurality shape memory alloy wires including a first wire coupled to a first side of the head portion and a second wire coupled to a second side of the head portion and the first and second wire cross to couple to the first and second sides of the head portion.

12. The head suspension assembly of claim 9 including a pitch axis through the load point and the first and second flexure elements are coupled to the head portion spaced from the pitch axis and are cooperatively energized to adjust a pitch attitude of the head portion.

13. The head suspension assembly of claim 9 wherein the plurality of flexure elements include a first end connected to the suspension arm and a second end coupled to the head portion.

14. An assembly comprising a suspension portion and a head portion; and at least one flexure element formed of a shape memory material coupled to the head portion at a distance spaced from a pitch axis of the head portion to adjust a pitch attitude of the head portion.

15. The assembly of claim 14 comprising first and second flexure elements formed of a shape memory material coupled to opposed first and second sides of the head portion spaced from a roll axis of the head portion to adjust a roll attitude of the head portion.

16. The assembly of claim 14 comprising at least two flexure element coupled to the head portion wherein one of said at least two flexure elements is coupled to the head portion at a distance spaced from the pitch axis of the head portion and energizable to supply a first flexure force in a first direction and the other of said at least two flexure elements is coupled to the head portion spaced from the pitch axis and energizable to supply a second flexure force in a second opposed direction to selectively increase or decrease the pitch attitude of the head portion.

17. A method for adjusting a pitch attitude of a head comprising steps of:

energizing a flexure element formed of a shape memory alloy material coupled to a head at a distance spaced from a pitch axis of the head to supply a flexure force to the head to adjust the pitch attitude of the head.

18. The method of claim 17 and further comprising the steps of:

selectively energizing one of a plurality of flexure elements coupled to the head to selectively increase or decrease the pitch attitude of the head.

19. The method of claim 17 wherein the step of energizing the flexure element comprises the step of:

supplying a voltage potential across opposed terminals of the flexure element.

20. The method of claim 17 and further comprising the step of:

measuring a pitch static attitude of the head; and energizing the flexure element to adjust the pitch attitude of the head based upon the measured pitch static attitude of the head.

21. A method for adjusting a roll attitude of a head comprising steps of:

energizing a shape memory flexure element formed of a shape memory material coupled to a head portion at a distance spaced from a roll axis of the head portion to supply a flexure force to the head portion to adjust the roll attitude of the head.

22. The method of claim 21 and further comprising the steps of:

selectively energizing one of a plurality of flexure elements coupled to the head portion to selectively adjust the roll attitude of the head in a first direction or a second opposed direction.

23. The method of claim 22 and further comprising the step of:

measuring a roll static attitude of the head; and energizing the one of the plurality of flexure elements to adjust the roll attitude of the head based upon the measured roll static attitude of the head.

* * * * *